US011911322B2

(12) United States Patent
Stroble

(10) Patent No.: US 11,911,322 B2
(45) Date of Patent: Feb. 27, 2024

(54) RECLINING WHEELCHAIR APPARATUS

(71) Applicant: Sallie Stroble, Atlanta, GA (US)

(72) Inventor: Sallie Stroble, Atlanta, GA (US)

( * ) Notice: Subject to any disclaimer, the term of this patent is extended or adjusted under 35 U.S.C. 154(b) by 538 days.

(21) Appl. No.: 17/192,524

(22) Filed: Mar. 4, 2021

(65) Prior Publication Data

US 2022/0280359 A1 Sep. 8, 2022

(51) Int. Cl.
*A61G 5/00* (2006.01)
*A61G 5/10* (2006.01)

(52) U.S. Cl.
CPC ........... *A61G 5/006* (2013.01); *A61G 5/1067* (2013.01); *A61G 5/1051* (2016.11); *A61G 2200/32* (2013.01); *A61G 2200/34* (2013.01)

(58) Field of Classification Search
CPC .............................. A61G 5/1067; A61G 5/006
See application file for complete search history.

(56) References Cited

U.S. PATENT DOCUMENTS 3,137,511 A * 6/1964 Weil ..................... A61G 5/0891 280/30
3,284,126 A 11/1966 Piazza
4,700,415 A 10/1987 DiMatteo
4,987,620 A 1/1991 Sharon
4,997,200 A * 3/1991 Earls ...................... A61G 5/006 280/304
5,366,036 A 11/1994 Perry
7,306,251 B2 12/2007 Bright
9,248,066 B2 2/2016 Tsukada

FOREIGN PATENT DOCUMENTS

KR 20150131687 A * 11/2015

* cited by examiner

*Primary Examiner* — Kevin Hurley

(57) ABSTRACT

A reclining wheelchair apparatus for providing a convenient way for wheelchair users to rest or be cared for includes a chair base frame and a plurality of wheels coupled to the chair base frame. A seat bottom is coupled to a base top side and a pair of pivot brackets is pivotably coupled to a base top side adjacent the base back side. A chair back is coupled to the pair of pivot brackets and moves between an upright position and a reclined position. The pair of pivot brackets rests on a pair of bracket supports when the chair back is in the reclined position. A pair of locking pins is coupled to the pair of pivot brackets and selectively engages with the base top side to secure the chair back in the upright position.

12 Claims, 5 Drawing Sheets

RECLINING WHEELCHAIR APPARATUS

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wheelchair devices and more particularly pertains to a new wheelchair device for providing a convenient way for wheelchair users to rest or be cared for.

(2) Description of Related Art Including Information Disclosed Under 37 CFR 1.97 and 1.98

The prior art relates to wheelchair devices. Most existing wheelchair devices are either in a fixed upright position or have an adjustment mechanism to change the angle of inclination for user comfort without offering a fully reclined position. Other devices include actuators or transform into full gurneys, rather than offering a simple locking pin and support to allow the back to fully recline.

BRIEF SUMMARY OF THE INVENTION

An embodiment of the disclosure meets the needs presented above by generally comprising a chair base frame having a base front side, a base back side, a base left side, a base right side, a base top side, and a base bottom side. A plurality of wheels is coupled to the chair base frame. A seat bottom is coupled to the base top side of the chair base frame. A pair of pivot brackets is pivotably coupled to the base top side adjacent the base back side of the chair base frame. A chair back is coupled to the pair of pivot brackets and moves between an upright position and a reclined position. A pair of bracket supports is coupled to the base back side adjacent the base top side of the chair base frame. The pair of pivot brackets rests on the pair of bracket supports when the chair back is in the reclined position. A pair of locking pins is coupled to the pair of pivot brackets. Each locking pin is selectively engageable with the base top side to secure the chair back in the upright position.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
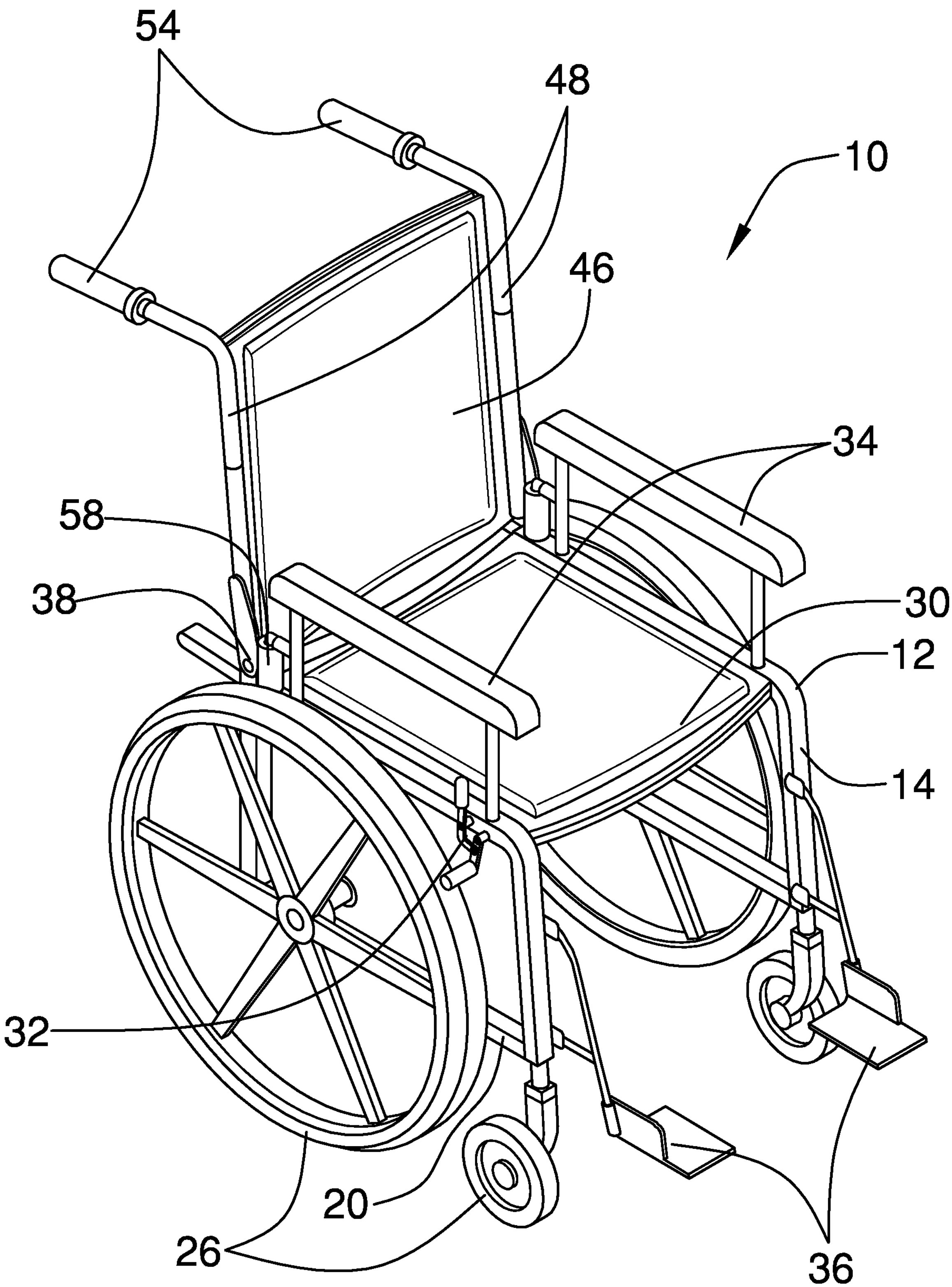
FIG. 1 is an isometric view of a reclining wheelchair apparatus according to an embodiment of the disclosure.

With reference now to the drawings, and in particular to FIGS. 1 through 5 thereof, a new wheelchair device embodying the principles and concepts of an embodiment of the disclosure and generally designated by the reference numeral 10 will be described.

As best illustrated in FIGS. 1 through 5, the reclining wheelchair apparatus 10 generally comprises a chair base frame 12 having a base front side 14, a base back side 16, a base left side 18, a base right side 20, a base top side 22, and a base bottom side 24. A plurality of wheels 26 is coupled to the chair base frame 12. The plurality of wheels 26 may include a pair of fixed back wheels 28 extending above the base top side 22 and a pair of rotating front wheels 29 coupled to the base bottom side 24 adjacent the base front side 14.

Figure 2:
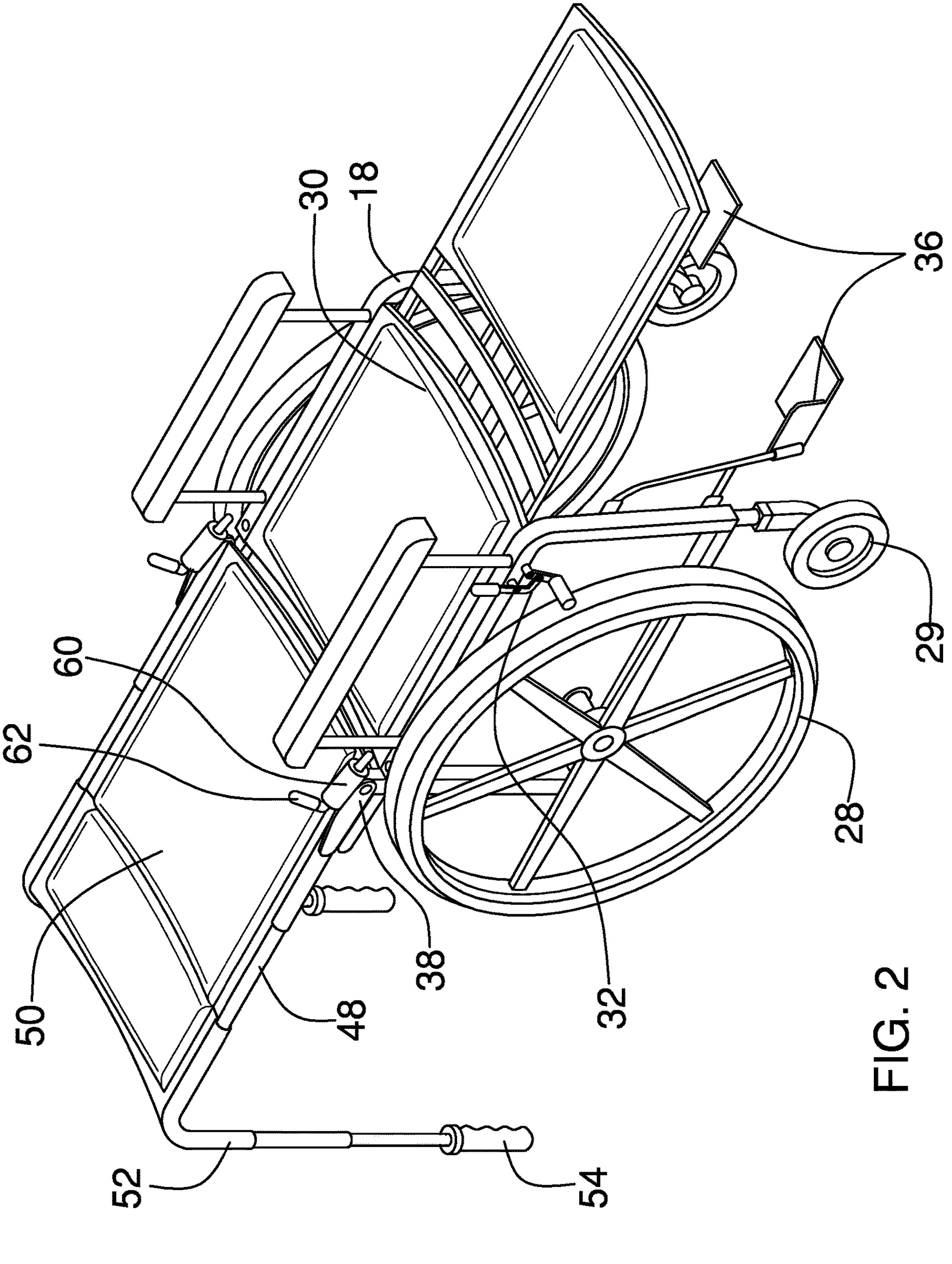
FIG. 2 is an isometric view of an embodiment of the disclosure.
Figure 3:
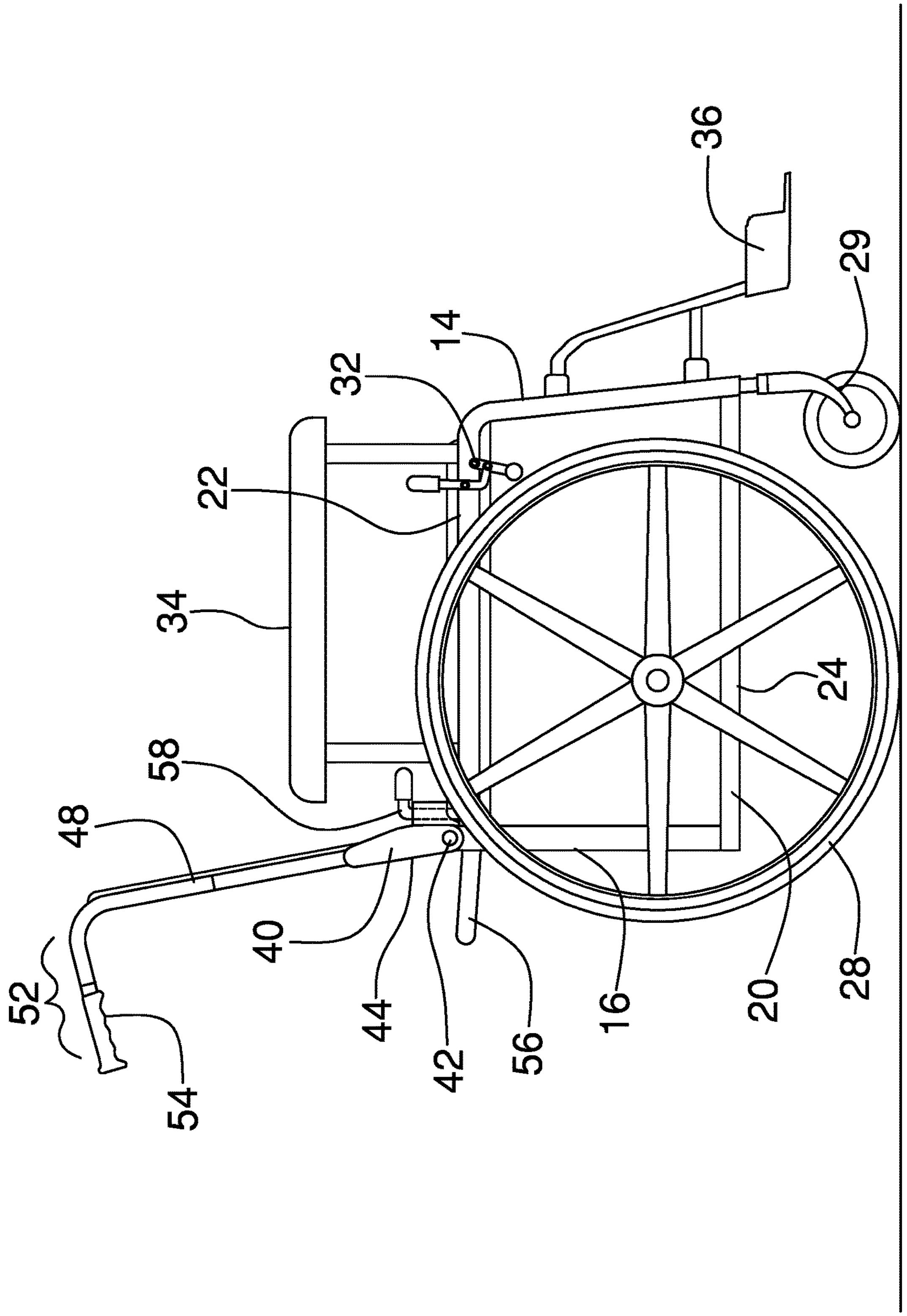
FIG. 3 is a side elevation view of an embodiment of the disclosure.
Figure 4:
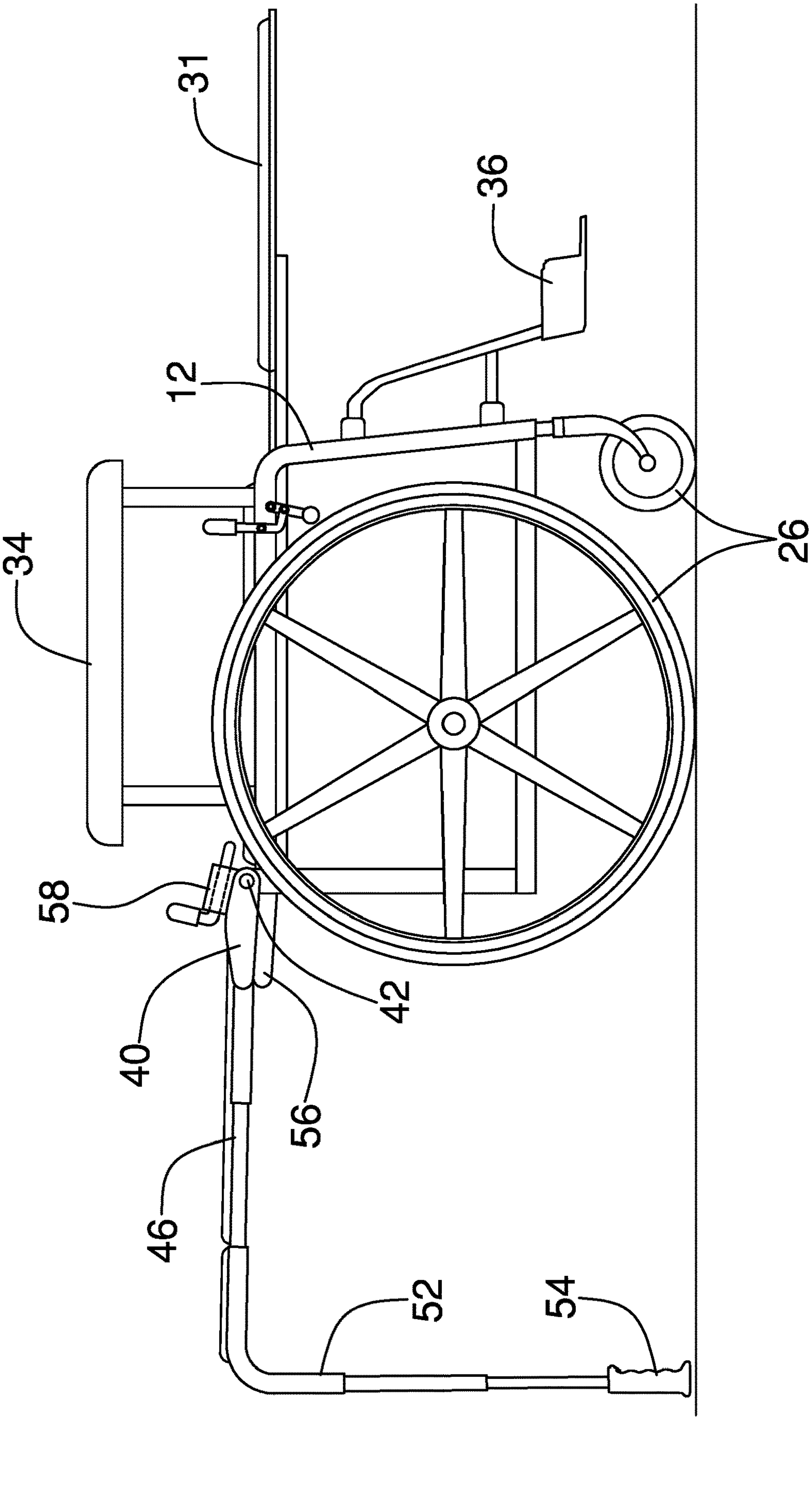
FIG. 4 is a side elevation view of an embodiment of the disclosure.
Figure 5:
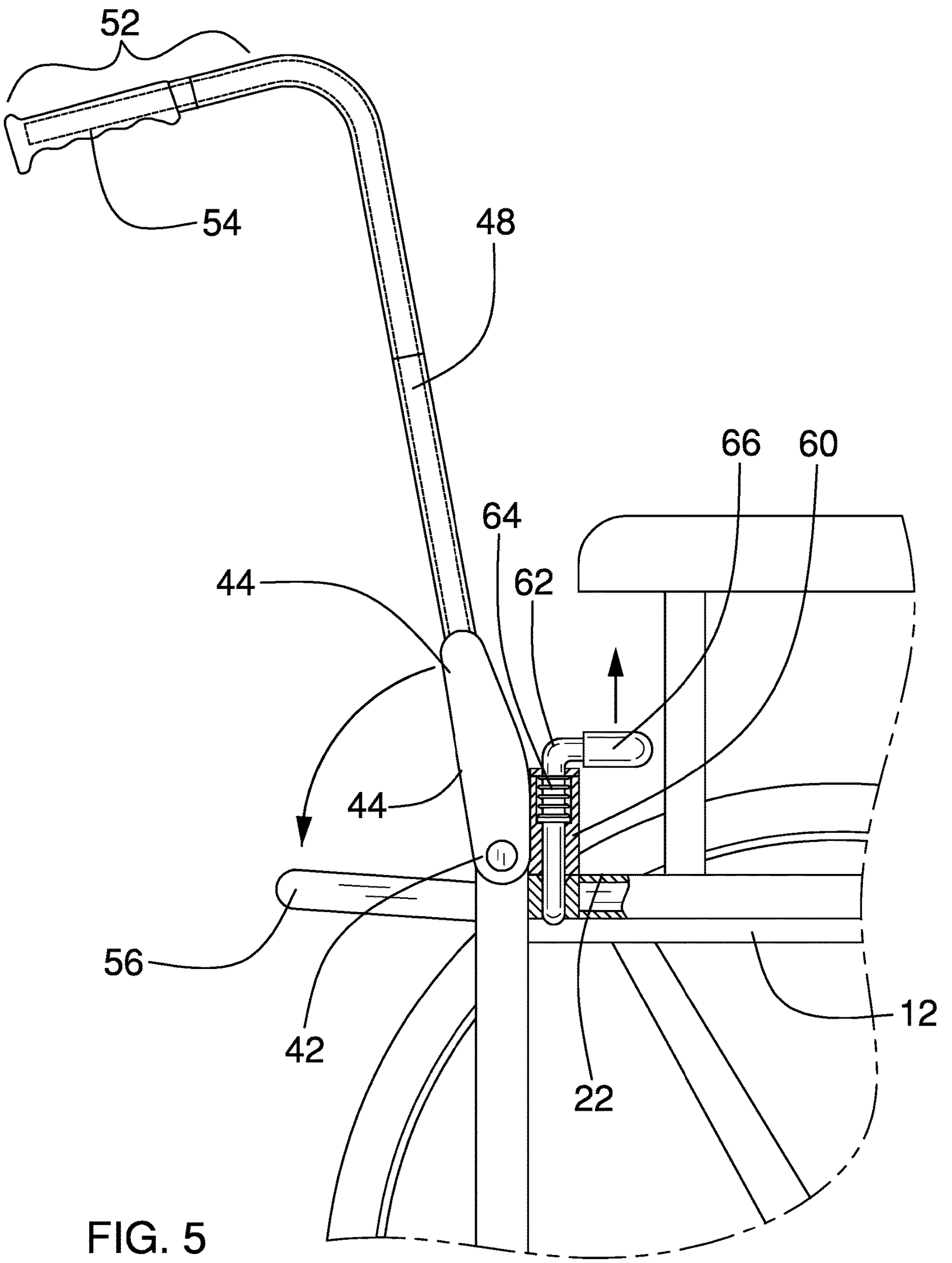
FIG. 5 is a detail view of an embodiment of the disclosure.

A seat bottom 30 is coupled to the base top side 22. The seat bottom 30 may extend from the base left side 18 to the base right side 20 and may be foldable to allow the chair base frame 12 to fold. A seat bottom extension 31 may be slidably engageable with the seat bottom 30 and extends as shown in FIG. 2. A pair of wheel brakes 32 may be coupled to the base left side 18 and the base right side 20 and in operational communication with the pair of fixed back wheels 28 to prevent the apparatus 10 from moving when desired. A pair of arm rests 34 may be coupled to the base top side 22 adjacent the base left side 18 and the base right side 20, and a pair of foot rests 36 may be pivotably coupled to the base left side 18 and the base right side 20 and positionable to extend past the base front side 14.

A pair of pivot brackets 38 is coupled to the chair base frame 12. Each pivot bracket 38 has a bracket plate 40 and a pivot rod 42 coupled to the bracket plate 40. The pivot rod 42 is pivotably coupled to the base top side 22 adjacent the base back side 16. Each bracket plate 40 may have a planar back edge 44.

A chair back 46 is coupled to the pair of pivot brackets 38. The chair back 46 includes a pair of back frames 48 coupled to the pair of pivot brackets 38 and a back sling 50 coupled between the pair of back frames 48. Each back frame 48 may be telescopable. The back sling 50 may also be foldable to allow the chair base frame 12 to fold. Each back frame 48 may include a bent handle portion 52 with an ergonomic grip 54. The chair back 46 moves between an upright position shown in FIG. 3 and a reclined position shown in FIG. 4.

A pair of bracket supports 56 is coupled to the base back side 16 adjacent the base top side 22. The pair of pivot brackets 38 rests on the pair of bracket supports 56 when the chair back 46 is in the reclined position. Each bracket support 56 may form an angle with the base back side 16 between 90°-115° to provide a fully flat or nearly flat transition between the seat bottom 30 and the back sling 50.

A pair of locking pins 58 is coupled to the pair of pivot brackets 38. Each locking pin 58 comprises a cylindrical pin housing 60 coupled to the respective pivot bracket 38 and a pull pin 62 slidably coupled through a pin aperture 64 of the pin housing 60. The pull pin 62 is selectively engageable with the base top side 22 to secure the chair back 46 in the upright position. The pull pin 62 may include a spring 64 coupled within the pin aperture 64 to bias the pull pin 62 towards an engaged position with the base top side 22 to prevent accidental disengagement. The pull pin 62 may be L-shaped and has a padded horizontal grip portion 66 for easy manipulation.

In use, the chair back 46 in the upright position allows the apparatus 10 to be used as a traditional wheelchair. When desired, the pair of locking pins 58 are disengaged by pulling up on the horizontal grip portion 66 to allow the pivot brackets 38 to pivot until they rest on the pair of bracket supports 56 and the chair back is in the reclined position. The user may then lie down fully in order to be cared for or to rest.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A reclining wheelchair apparatus comprising:
- a chair base frame having a base front side, a base back side, a base left side, a base right side, a base top side, and a base bottom side;
- a plurality of wheels coupled to the chair base frame;
- a seat bottom coupled to the chair base frame, the seat bottom being coupled to the base top side;
- a pair of pivot brackets coupled to the chair base frame, the pair of pivot brackets being pivotably coupled to the base top side adjacent the base back side;
- a chair back coupled to the pair of pivot brackets, the chair back moving between an upright position and a reclined position;
- a pair of bracket supports coupled to the chair base frame, the pair of bracket supports being coupled to the base back side adjacent the base top side, the pair of pivot brackets resting on the pair of bracket supports when the chair back is in the reclined position; and
- a pair of locking pins coupled to the pair of pivot brackets, each locking pin being selectively engageable with the base top side to secure the chair back in the upright position.

2. The reclining wheelchair apparatus of claim 1 further comprising each pivot bracket having a bracket plate and a pivot rod coupled to the bracket plate, the pivot rod being pivotably coupled to the base top side.

3. The reclining wheelchair apparatus of claim 1 further comprising each locking pin comprising a pin housing coupled to the respective pivot bracket and a pull pin slidably coupled through a pin aperture of the pin housing, the pull pin being selectively engageable with the base top side.

4. The reclining wheelchair apparatus of claim 3 further comprising the pin housing being cylindrical.

5. The reclining wheelchair apparatus of claim 3 further comprising the pull pin having a spring coupled within the pin aperture.

6. The reclining wheelchair apparatus of claim 3 further comprising the pull pin being L-shaped and having a horizontal grip portion.

7. The reclining wheelchair apparatus of claim 6 further comprising the handle grip portion being padded.

8. The reclining wheelchair apparatus of claim 1 further comprising each bracket support forming an angle with the base back side between 90°-115°.

9. The reclining wheelchair apparatus of claim 1 further comprising the chair back including a pair of back frames coupled to the pair of pivot brackets and a back sling coupled between the pair of back frames.

10. The reclining wheelchair apparatus of claim 9 further comprising each back frame having a bent handle portion.

11. The reclining wheelchair apparatus of claim 1 further comprising the bent handle portion having an ergonomic grip.

12. A reclining wheelchair apparatus comprising:
- a chair base frame having a base front side, a base back side, a base left side, a base right side, a base top side, and a base bottom side;
- a plurality of wheels coupled to the chair base frame;
- a seat bottom coupled to the chair base frame, the seat bottom being coupled to the base top side;
- a pair of pivot brackets coupled to the chair base frame, each pivot bracket having a bracket plate and a pivot rod coupled to the bracket plate, the pivot rod being pivotably coupled to the base top side adjacent the base back side;
- a chair back coupled to the pair of pivot brackets, the chair back including a pair of back frames coupled to the pair of pivot brackets and a back sling coupled between the pair of back frames, each back frame having a bent handle portion, the bent handle portion having an ergonomic grip, the chair back moving between an upright position and a reclined position;

a pair of bracket supports coupled to the chair base frame, the pair of bracket supports being coupled to the base back side adjacent the base top side, each bracket support forming an angle with the base back side between 90°-115°, the pair of pivot brackets resting on the pair of bracket supports when the chair back is in the reclined position; and a pair of locking pins coupled to the pair of pivot brackets, each locking pin comprising a cylindrical pin housing coupled to the respective pivot bracket and a pull pin slidably coupled through a pin aperture of the pin housing, the pull pin being selectively engageable with the base top side to secure the chair back in the upright position, the pull pin having a spring coupled within the pin aperture, the pull pin being L-shaped and having a padded horizontal grip portion.

* * * * *